(12) United States Patent
Ewing et al.

(10) Patent No.: US 8,541,906 B2
(45) Date of Patent: Sep. 24, 2013

(54) POLYPHASE POWER DISTRIBUTION AND MONITORING APPARATUS

(75) Inventors: Carrel W. Ewing, Reno, NV (US); Andrew J. Cleveland, Reno, NV (US); James P. Maskaly, Sparks, NV (US)

(73) Assignee: Server Technology, Inc., Reno, NV (US)

( * ) Notice: Subject to any disclaimer, the term of this patent is extended or adjusted under 35 U.S.C. 154(b) by 0 days.

(21) Appl. No.: 13/181,390

(22) Filed: Jul. 12, 2011

(65) Prior Publication Data

US 2012/0007423 A1 Jan. 12, 2012

Related U.S. Application Data

(63) Continuation of application No. 12/857,420, filed on Aug. 16, 2010, now Pat. No. 7,977,815, which is a continuation of application No. 12/194,390, filed on Aug. 19, 2008, now Pat. No. 7,777,365, which is a continuation of application No. 10/698,023, filed on Oct. 31, 2003, now Pat. No. 7,414,329.

(60) Provisional application No. 60/516,671, filed on Oct. 30, 2003.

(51) Int. Cl.
*H02J 3/00* (2006.01)

(52) U.S. Cl.
USPC .......................................................... 307/13

(58) Field of Classification Search
USPC .......................................... 307/11, 13, 14, 27
See application file for complete search history.

(56) References Cited

U.S. PATENT DOCUMENTS

| | | | |
|---|---|---|---|
| 6,476,729 B1 * | 11/2002 | Liu | ........................ 340/870.11 |
| 6,967,283 B2 | 11/2005 | Rasmussen et al. | |
| 7,271,506 B1 | 9/2007 | Bersiek | |

OTHER PUBLICATIONS

Server Technology, Inc.; "Amended Complaint for Patent Infringement & Jury Demand and Exhibits"; *Server Technology, Inc. v. American Power Conversion Corporation*; Case No. 3:11-CV-00068-ECR-(RAM); Apr. 28, 2011; 45 pp.

American Power Conversion Corp.; "American Power Conversion Corporation'S Initial Defenses and Counterclaims to Plaintiff'S Amended Complaint"; *Server Technology, Inc. v. American Power Conversion Corporation*; Case No. 3:11-CV-00068-ECR-(RAM); May 12, 2011; 10 pp.

American Power Conversion Corp., American Power Conversion Corporation's Initial Disclosure of Non-Infringement, Invalidity, and Unenforceability Contentions; *Server Technology, Inc. v. American Power Conversion Corporation*; Case No. 3:11-CV-00068-ECR-(RAM); Dec. 16, 2011; 25 pp.

(Continued)

*Primary Examiner* — Carlos Amaya

(74) *Attorney, Agent, or Firm* — Holland & Hart LLP

(57) ABSTRACT

A polyphase power distribution and monitoring apparatus having sets of outputs for each phase of power and monitors for each phase of power disposed in the housing. Each monitor provides a visible display of current for an associated phase of power and an audible alarm for each phase of power if the current exceeds a predetermined value or falls below a predetermined value. In three-phase wye power systems, the apparatus preferably includes a neutral line monitor, including a neutral line current display and audio alarm, for the neutral line of the wye power circuit. The apparatus preferably is lightweight, elongated, portable, and mountable to the side of an electronic equipment rack. It may also include additional power monitoring systems such as network power monitoring tools for remotely monitoring the apparatus.

9 Claims, 4 Drawing Sheets

(56) References Cited

OTHER PUBLICATIONS

Server Technology, Inc.; "Second Amended Complaint for Patent Infringement and Jury Demand and Exhibits"; *Server Technology, Inc.* v. *American Power Conversion Corporation*; Case No. 3:11-CV-00068-ECR-(RAM), Dec. 19, 2011, 99 pp.

American Power Conversion Corp.; "American Power Conversion Corporation's Answer, Defenses and Counterclaims to Plaintiff's Second Amended Complaint"; *Server Technology, Inc.* v. *American Power Conversion Corporation*; Case No. 3:11-CV-00068-ECR-(RAM); Jan. 9, 2012; 17 pp.

American Power Conversion Corp.; "APC's Initial Disclosure Pursuant to LR 16.1-8(d)—Invalidity Claim Chart Exhibit B-1"; *Server Technology, Inc.* v. *American Power Conversion Corporation*; Case No. 3:11-CV-00068-ECR-(RAM); Dec. 16, 2011; 44 pp.

American Power Conversion Corp.; "APC's Initial Disclosure Pursuant to LR 16.1-8(d)—Invalidity Claim Chart Exhibit C-1"; *Server Technology, Inc.* v. *American Power Conversion Corporation*; Case No. 3:11-CV-00068-ECR-(RAM); Dec. 16, 2011; 25 pp.

American Power Conversion Corp.; "APC's Initial Disclosure Pursuant to LR 16.1-8(d)—Invalidity Claim Chart Exhibit D-1"; *Server Technology, Inc.* v. *American Power Conversion Corporation*; Case No. 3:11-CV-00068-ECR-(RAM); Dec. 16, 2011; 22 pp.

American Power Conversion Corp.; "APC's Initial Disclosure Pursuant to LR 16.1-8(d)—Invalidity Claim Chart Exhibit E-1"; *Server Technology, Inc.* v. *American Power Conversion Corporation*; Case No. 3:11-CV-00068-ECR-(RAM); Dec. 16, 2011; 15 pp.

Pulizzi Engineering, Inc.; "AC Power for Worldwide Requirements: Selection and Design Guide"; 31 pp.; Santa Ana, CA, 1999.

Pulizzi Engineering, Inc.; "Power Distribution & Control for All Your Worldwide Applications"; 2001; 44 pp.; Santa Ana, CA.

American Power Conversion Corp.; "Power Struxure Type A Installation Overview"; Feb. 2002; 2 pp.

American Power Conversion Corp.; "Power Struxure Rack-Mount Power Distribution Units"; Jan. 21, 2011; 2 pp.

Tom Hend; "PowerStruXure UPS: APC delivers lean and mean rack power"; Network World; Aug. 19, 2002; 4 pp.

American Power Conversion Corp.; "APC Provides 'Infrastructure on Demand(TM)' with New PowerStruXure (TM)"; Aug. 11, 2011; 2 pp.

American Power Conversion Corp.; "APC Silcon 60-80kW 208/480V UPS User Guide"; 2000; 34 pp.

American Power Conversion Corp.; "APC Silcon 60-80kW 208/480V UPS Installation Guide"; 2000; 94 pp.

American Power Conversion Corp.; "Three-Phase Rack Power Distribution Unit AP7601, AP7602, AP7608: Installation and Operation Manual"; 2003; 21 pp.

American Power Conversion Corp.; "Power StruXure User's Manual"; Nov. 2001; 179 pp.

\* cited by examiner

POLYPHASE POWER DISTRIBUTION AND MONITORING APPARATUS

This application is a continuation of U.S. patent application Ser. No. 12/857,420 filed on Aug. 16, 2010, which is a continuation of U.S. patent application Ser. No. 12/194,390, now issued as U.S. Pat. No. 7,777,365, filed on Aug. 19, 2008, which is a continuation of U.S. patent application Ser. No. 10/698,023, now issued as U.S. Pat. No. 7,414,329 B1, filed on Oct. 31, 2003, which claims the benefit of U.S. Provisional Application No. 60/516,671 filed on Oct. 30, 2003. The entire disclosure of each of these applications is incorporated herein by reference.

FIELD OF THE INVENTION

The present invention relates to power distribution apparatus for the distribution of polyphase alternating current. More particularly, the present invention relates to apparatus for distributing polyphase alternating current and monitoring information relating to polyphase power distributable by the apparatus.

BACKGROUND

Electric current that reverses periodically, usually many times per second, is called "alternating current" In most public or commercial power distribution networks, electrical current is delivered to a customer or user as alternating current.

Electric current is induced to reverse or alternate periodically by a voltage that reverses or alternates periodically. One complete voltage period, with accompanying current flow in one direction and then the other, is called a cycle. In the United States, 60 cycles per second (also referred to as "60 Hz") is the standard frequency of alternating current in most environments. In Europe, 50 Hz is the standard.

Typically, the graphical form of the level of alternating voltage over a period or cycle is generally sinusoidal. This is because the near sinusoidal form is relatively easy, economical, and efficient to generate, deliver, and utilize.

Power distributed to small businesses or homes is commonly "single phase" or "dual phase" power. In a single phase system, a single alternating voltage is distributed through a two-line connection. In a dual phase system, two alternating voltages are distributed through at least three lines: one neutral line and one other line for each of the two alternating voltages. The time that the voltage on one of these lines is zero and the time that voltage on the second of these lines is zero are separated by a time period equivalent to the time lapse of one half of one cycle. The two voltages are separated in time by a "phase difference"—that is, the sinusoidal form of the voltage on one line leads or lags the sinusoidal form of the voltage on the other line by the amount of the phase differential. The effective voltage between the first phase line and the second phase line is therefore significantly greater that the effective voltage between each of the phase lines and the neutral line. As a result, a three-line, two-phase system may provide, for example, 120 volts in a phase-to-neutral line circuit and 240 volts in a phase-to-phase line circuit.

In large commercial and industrial applications, three phase systems have long been common. In three phase systems, each voltage cycle on each phase line is 120 degrees, or ⅓ of a period, out of phase with the voltage cycle on each of the other two phase lines. Three phase systems are used in large commercial and industrial applications because three-phase equipment is smaller in size, weighs less, and is more efficient than single or dual phase equipment. Although three phase circuits are somewhat more complex than single or dual phase circuits, they too weigh less than single phase circuitry for the same loads supported by the circuitry. Three phase circuits also can provide a wide range of voltages and can be used for single or dual phase loads.

Three phase circuits power is generated by circuits in either of two configurations: (i) a "delta"; or (ii) a "wye" configuration. If one end of each of the legs of a three-phase circuit are centrally connected at a common point and the other ends are connected to three phase lines (one line for each phase), the configuration is called a wye or "Y" connection. If the legs of the three phase circuits are connected instead in series to form a closed loop, with one phase line connected to each junction of two adjacent legs, the configuration is called a delta or "Δ."

One reason that three phase circuits are more complex than typical single phase and dual phase circuits is the need to maintain at least somewhat balanced loads among each of the three phases. One indicator of imbalance is the level of current flowing through each phase line. If the level of current flowing through a phase line is different than that flowing through a different phase line, the load is obviously unbalanced. In a wye connected system, imbalance can also be indicated by current flowing through the neutral line, and this situation can arise when the amount of current flowing through each phase is identical in amplitude but differing in phase due to the nature of the loads served by the lines. Imbalance between the loads can result in damage to the three phase system, can cause excessive wear of components in the system such as the three-phase generator, and can be difficult and costly to correct.

For example, in many industrial three-phase applications, such as computer and communications network applications, three-phase power is supplied to racks of equipment. One common prior art system provides three-phase power to one or more racks via a four line input, providing a line for each voltage phase and a common ground or neutral line. An elongated power distribution plug strip connects to the input and distributes power of differing phases to a plurality of plug strip outputs for the phase. The three-phase plugstrip typically provides three branches of outputs, one branch for each phase of power provided by the three-phase plugstrip. This plugstrip is mountable on or adjacent to a given equipment rack in order to supply three branches single phase power (with each such branch derived from the three-phase power intput) to the rack or other equipment in the vicinity.

In order to help ensure that each branch of outputs supplies a cumulative load that is balanced as compared to the cumulative load served by the other branches of outputs, this prior art three-phase plugstrip has included a single current display visible to an operator along the face of the plugstrip in which the outputs are also mounted. The Installer or on-site operator or user (collectively the "operator") can use this display to determine the total amount of current flowing through each branch of outputs by physically pushing an associated button mounted on the plugstrip housing. This causes the display to cycle through numerical indications of the total current for each differing phase branch of output. If the current indicated for one phase set (branch) is different than that for another current indicated for a different phase set of outputs, the loads are unbalanced. When this difference becomes too great, the operator is thereby alerted to the need to take corrective action to correct the imbalance.

The applicant has discovered that another problem with this type of prior art system is that it requires the operator to take the time and effort to stop whatever the operator may be doing, turn attention to the plugstrip, and press the display button on the plugstrip to cycle through and observe the current indicators for the various phases. In the ease of a wye connected system, this type of prior art also typically has not provided for display or ready determination of the level of current flowing through the neutral line. As a result, users of such prior art systems may not be receive any indication of imbalance when current flows through the neutral line, indicating an imbalance in fact, but the current level flowing through each phase provides no such indication.

Prior art power supply systems have also included other tools to help determine imbalance among loads supplied by three-phase systems. One such system in common use includes a remote power management feature that remotely monitors the power supply plugstrip through a network connection between the plugstrip and a computer with an associated computer screen. A user at the computer screen can observe information about each phase of power and whether there is an imbalance between phases.

This type of network system, however, requires the user to have access to a computer screen in order to observe information about the level of imbalance, and this type of computer screen is often unavailable or is otherwise inconvenient to inspect at the on-site location of the plugstrip itself. At this location, for example, there may be no space available for a computer screen much less one networked to the plugstrip, and during installation of the plugstrip, the installer may have little time or ability to set-up or inspect a computer screen.

BRIEF SUMMARY OF THE INVENTION

The applicant has invented a polyphase alternating current power distribution apparatus providing a plurality of power information monitors secured to the housing of the apparatus. Preferably, the apparatus includes a monitor for each phase of power distributed by the apparatus and for the neutral line in the case of a polyphase system utilizing a neutral line, such as a wye-connected system.

Most preferably, the power information monitors each display the current flowing in an associated phase line or neutral line as applicable. The information monitors also may issue an audible alarm if the current flow in the associated line exceeds an adjustable predetermined level.

Preferably, the housing for the apparatus is elongated, phase power outputs are mounted in clusters along an elongated side of the housing, and for each such cluster, the power information monitor is mounted adjacent the cluster in an elongated side of the housing. The apparatus may be most advantageously mounted vertically adjacent or within a vertical side of an electrical or electronic equipment rack.

Preferably, each of the power information monitors is readily viewable by a user during installation or use of the apparatus. Preferably, the apparatus readily provides information and associated sensory alarms, such as audio alarms, indicative of possible load balance or imbalance between the power phases distributed by the apparatus.

In the preferred apparatus, additional power monitoring features also can be provided, including remote power management and monitoring, audible alarms, or fuses. Most preferably, the power distribution apparatus is relatively lightweight, economical, and easy to manufacture, install, and use.

There are additional novel and inventive aspects of the preferred embodiments. They will become apparent as the specification proceeds. In this regard, it is to be understood that the scope of the invention is to be measured by the claims as issued and not whether any given subject matter provides any or all features recited this Brief Summary of the Invention.

BRIEF DESCRIPTION OF THE DRAWINGS

The preferred embodiments of the present invention is shown in the accompanying drawing in which.

In the following specification, certain spatially identifying terms are used, such as the term "vertical." It is to understood that this terminology is used to identify the orientation of the element with respect to electrical or electronic equipment racks, which typically are mounted vertically with respect to a floor in room. These types of terms do not by themselves, however, require any absolute orientation in space.

DETAILED DESCRIPTION OF THE PREFERRED EMBODIMENTS

Figure 1:
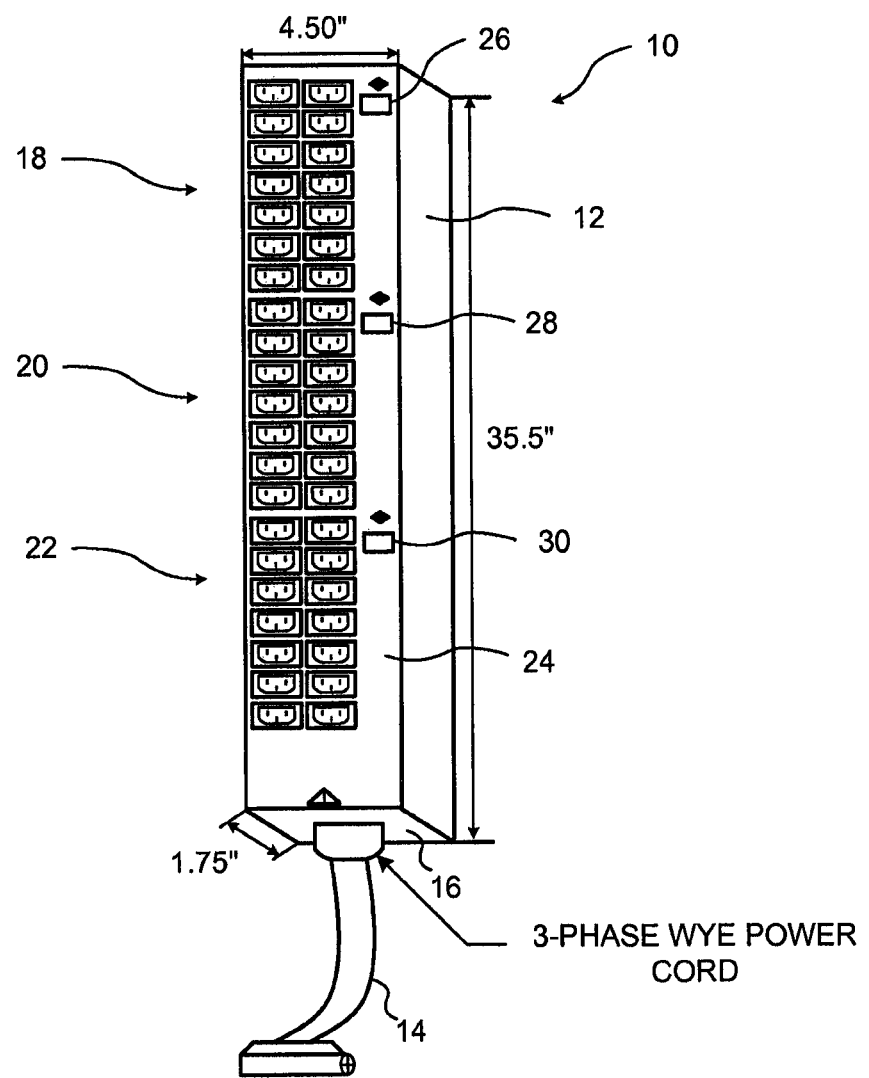
FIG. 1 is an isometric view of the applicant's preferred three-phase delta power distribution and monitoring apparatus.

With reference to FIG. 1, the preferred three-phase delta power distribution and monitoring apparatus, generally 10, has an elongated aluminum housing 12, a three-phase power input cord 14 penetrating one end 16 of the housing 12, three sets of power output plug receptacles, generally 18, 20, and 22 on an elongated faceplate side 24 of the housing 12, and, adjacent each set of power output plug receptacles 18, 20, and 22, an associated phase line current display 26, 28, 30 respectively. In the preferred embodiment of FIG. 1, the housing 12 measures 35.5 inches long, by 4.5 inches wide, by 1.75 inches deep.

The entire power distribution and monitoring apparatus 10 weighs twenty-one to twenty-three lbs. and is easily transported and vertically mounted on an associated RETMA electronic equipment rack (not shown). In the preferred embodiment, the housing 10 can include fasteners and fastener passages (not shown) in order to secure the housing 10 to a RETMA rack.

Figure 4:
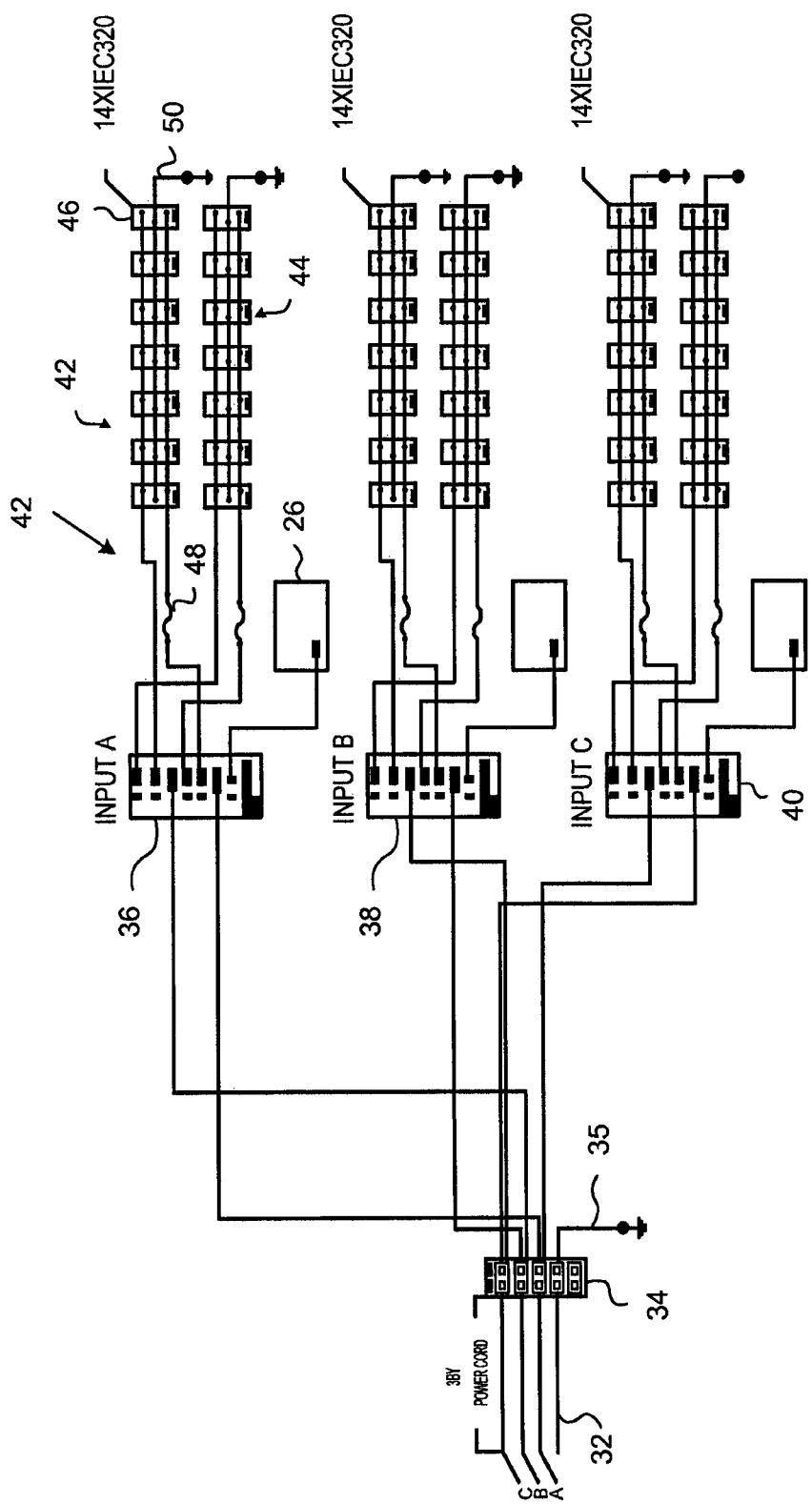
FIG. 4 is a schematic wiring diagram of the three-phase delta power distribution and monitoring apparatus of FIG. 1.

Referring now to FIG. 4, the three-phase power input cord 14 has four lines: line A, line B, and line C, and power ground 32. These four lines A, B, C, 32 all terminate in a terminal block 34. The power ground 32 is, in turn, grounded 35 to the housing or enclosure 12 (not shown in FIG. 4).

Three power supplies 36, 38, 40 are connected to the terminal block 34. The power supply for phase A (36) is connected through terminal block 34 to line A and line B. The power supply for phase B (38) is connected through terminal block 34 to Line B and Line C. In turn, the power supply for phase C (40) is connected through terminal block 34 to Line C and Line A. The phase A power supply 36 therefore receives phase A to phase B voltage; the phase B power supply 38 receives phase B to phase C voltage; and the phase C power supply 40 receives phase C to phase A voltage.

Each power supply, e.g., A (36), provides its received phase-to-phase voltage to two associated sub-set or branches 42, 44 of seven power output plug receptacles, e.g., 46. Each such branch, e.g., 42, includes a fuse, e.g., 48, in the line to protect the branch from shorts and over-current conditions at or through associated branch outputs or outlets, e.g., 46. Each such outlet, e.g., 46, includes an output line 50 grounded to the housing 12 (not shown in FIG. 4). A standard electrical supply input plug (not shown) can then be inserted in any of the output receptacles, e.g., 46, and thereby receive associated phase power, e.g., A, from power supply 36 supporting the output receptacle 46.

Each power supply, e.g., A (36), includes circuitry that converts received phase power to 5 volt direct current ("VDC") and distributes the 5 VDC to an associated digital display module 26. The power supply 36 circuitry also (i) senses the magnitude of the total phase A current flowing through the power supply 36 to the fourteen power output receptacles, e.g., 46, supported by the power supply 36, (ii) converts the total phase A current magnitude to an 0-5 VDC analog signal representing the RMS of such total phase A current magnitude, and (iii) transmits the analog signal to the digital display module 26.

The digital display module 26 thereby displays the RMS phase A to phase B current value so that this value is visible to a user viewing the display module 26 on the housing 12. The digital display module 26 also includes an audio alarm and generates an audible alarm when the current value exceeds a preset level. In the preferred embodiment, the audio alarm is set to trigger, via jumpers set at the factory, at 20 or 30 amps and for overload, with a differing audio alarm at 31 amps.

Figure 2:
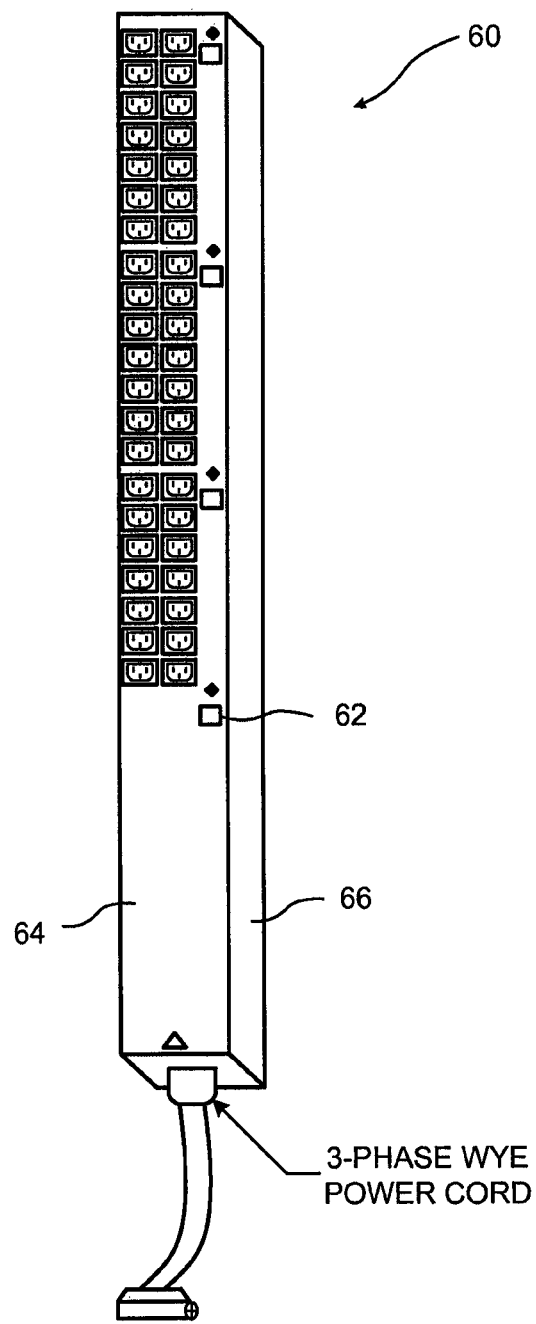
FIG. 2 is an isometric view of the applicant's preferred three-phase wye power distribution and monitoring apparatus.
Figure 3:
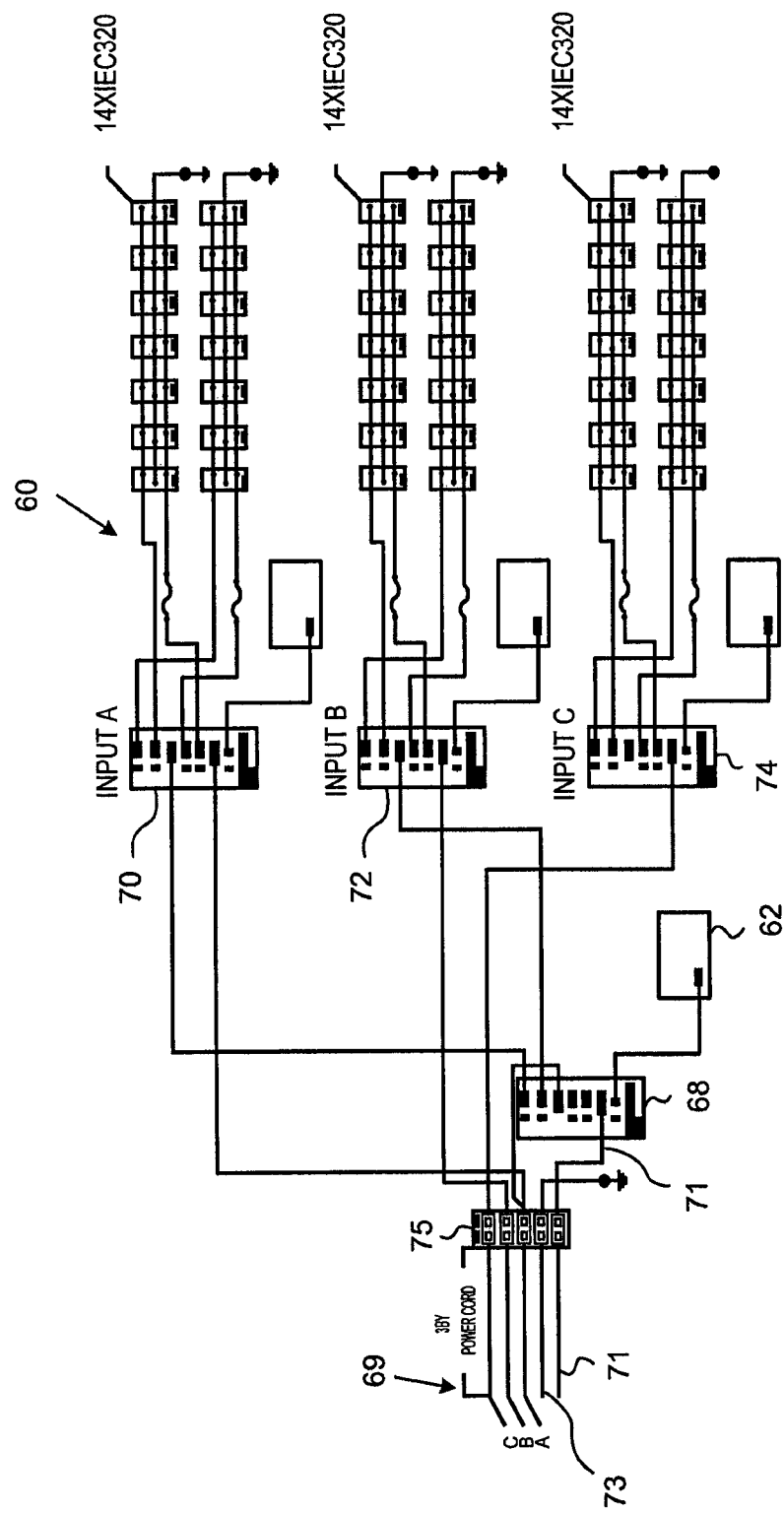
FIG. 3 is schematic wiring diagram of the three-phase wye power distribution and monitoring apparatus of FIG. 2.

With reference now to FIG. 2, the preferred three-phase wye power distribution and monitoring apparatus, generally 60, is configured much like the delta power distribution and monitoring apparatus of FIG. 1. The wye apparatus 60, however, also includes a neutral line current display and alarm 62 mounted in the elongated faceplate 64 on the housing or enclosure 66 and, as shown in FIG. 3, includes a neutral power supply 68, a three-phase wye power input cord, 69, and differing wiring among these components and the three power supplies: A (70), B (72), and C (74).

In this wye embodiment 60, the power input cord 69 has phase A, B, and C lines, a neutral line 71, and ground line 73. The ground line 73 is grounded to the housing through the terminal block 75, and the neutral line 71 is connected through the terminal block 75 to the neutral power supply 68. Power supply A (70) is connected through terminal block 75 to line A and, through the neutral power supply 68, to the neutral line 71. Power supply B (72) is connected through terminal block 75 to Line B and, through the neutral power supply 68, to the neutral line 71. In turn, power supply C (74) is connected through terminal block 75 to Line C and, through the neutral power supply 68, to the neutral line 71. Power supply A (70) therefore receives phase A to neutral voltage; power supply B (72) receives phase B to neutral voltage; and power supply C (74) receives phase C to neutral voltage.

The neutral power supply 68 also is connected through the terminal block 75 to the phase A line. The neutral power supply 68 includes circuitry that converts received phase A power to 5 volt direct current ("VDC") and distributes the 5 VDC to an associated neutral line digital display module 62. The power supply 68 circuitry also (i) senses the magnitude of the total neutral line current if any net neutral line current exists (in a perfectly balanced system, there is no net current in the neutral line), (ii) converts the neutral line current magnitude to a 0-5 VDC analog signal representing the RMS of such neutral current magnitude, and (iii) transmits the analog signal to the neutral line digital display module 62.

The digital display module 62 thereby displays the neutral line current value so that this value is visible to a user viewing the neutral line display module 62 on the housing faceplate 64. The neutral line digital display module 62 also includes an audio alarm and generates an audible alarm when the current value exceeds a preset level, as describe above. Alternatively or in addition, the digital display module 62 can include a differing sensory alarm when the current exceeds or falls below a predetermined level or range of values.

In the preferred embodiments, each power supply, e.g., 70, includes current distribution lines, a module for converting alternating current to direct current, a current sensing transducer, and a processor for converting analog output from the current sensing transducer to a digital output. Each digital display module, e.g., 62, includes a two digit LED indicator, an alarm buzzer, and a processor that generates an alarm when the current exceeds the factor pre-set level as explained above. These power supply 70 and digital display module 62 components are assembled in a fashion well known to those skilled in the art.

Both the delta and the wye power distribution and monitoring apparatus of FIGS. 1-4 may be adapted to provide or be implemented in conjunction with remote power management and reporting systems. Apparatus and systems for doing so are disclosed in references such as: (i) U.S. Pat. No. 5,506,573, entitled Remote Sensor and Method for Detecting the On/Off Status of An Automatically Controlled Appliance, issued to Ewing et al. on Apr. 9, 1996; (ii) U.S. Pat. No. 5,949,974, entitled System for Reading the Status and for Controlling the Power Supplies of Appliances Connected to Computer Networks, issued to Ewing et al. on Sep. 7, 1999; and (iii) the applicant's U.S. co-pending application entitled "Network Remote Power Management Outlet Strip," Ser. No. 10/313,314, filed Dec. 6, 2002, the disclosures of all of which references are hereby incorporated herein by reference in their entireties.

It can thus be seen that the applicant has provided a polyphase (and in the preferred embodiments, three-phase) power distribution and monitoring apparatus that preferably provide a clear but self-contained, unobtrusive, and space-saving power monitor for each of multiple power phases and, if desired, the neutral line in the case of a wye connected three-phase power supply system. In this regard, in this specification the term "monitor" means a current display or other sensory indicator, such as an audible or other sensory alarm, mountable on or to the housing of the power distribution and monitoring apparatus. The preferred embodiments also are relatively portable, lightweight, slim, economical, and easy to manufacture, install, use, and maneuver.

One skilled in the art may readily adapt other polyphase power supply systems to provide novel features of the types disclosed herein, such as, for example, on-site current displays and alarms for each phase or other line in the power supply system. The present invention is therefore not necessarily limited to, for example, three-phase systems by the detailed description of preferred embodiments set forth above.

What is claimed is:

1. A polyphase alternating current power distribution apparatus connectable to one or more electrical loads in an electrical equipment rack comprising, in combination:
    a vertical rack-mountable housing;
    a polyphase power input disposed in the vertical rack-mountable housing;
    a plurality of power outputs disposed on a face of the vertical rack-mountable housing, with at least one power output being in power supply communication with a first power phase provided by the polyphase power input and at least a second power output being in power supply communication with a second power phase provided by the polyphase power input; and a display system disposed on the face of the vertical rack-mountable housing comprising:
  a first display segment in power information determining communication with the first power phase; and
  a second display segment in power information determining communication with the second power phase;
whereby the first display segment can report visible first power phase information while the second display segment reports visible second power phase information.

2. The apparatus of claim 1, wherein the first display segment comprises a first power phase current visual display, and the second display segment comprises a second power phase current visual display, and wherein the apparatus further comprises:
  a plurality of current determination circuits disposed in the vertical rack-mountable housing with: (i) a first current determination circuit intermediate the display system and the first power phase; and (ii) a second current determination circuit intermediate the display system and the second power phase.

3. The apparatus of claim 1 wherein (i) the plurality of power outputs includes at least a third power output being in power supply communication with a third power phase provided by the polyphase power input; and (ii) the display system further comprises a third display segment in power information determining communication with the third power phase.

4. The apparatus of claim 2 wherein (i) the plurality of power outputs includes at least a third power output being in power supply communication with a third power phase provided by the polyphase power input; (ii) the display system further comprises a third display segment in power information determining communication with the third power phase; and (iii) the plurality of current determination circuits includes a third current determination circuit intermediate the display segment and third power phase.

5. The apparatus of claim 1 wherein the polyphase power input includes a neutral line and the display system further comprises a neutral displays segment power information determining communication with the neutral line.

6. The apparatus of claim 1, wherein the vertical rack-mountable housing has a vertical length, a width, and a depth, wherein the vertical length is elongate in comparison to the width and the depth.

7. The apparatus of claim 6, wherein the plurality of power outputs include at least a first sub-set of power outputs and a second sub-set of power outputs, the first sub-set of power outputs and the second sub-set of power outputs having an order along the vertical length of the face of the vertical rack-mountable housing.

8. The apparatus of claim 7, wherein the first display segment and the second display segment have an order along the vertical length of the face of the vertical rack- mountable housing, the order of the first display segment and the second display segment matching the order of the first sub-set of power outputs and the second sub-set of power outputs along the vertical length of the face of the vertical rack-mountable housing.

9. The apparatus of claim 1, wherein the display system is digital.

\* \* \* \* \*

UNITED STATES PATENT AND TRADEMARK OFFICE
CERTIFICATE OF CORRECTION

PATENT NO.            : 8,541,906 B2
APPLICATION NO.       : 13/181390
DATED                 : September 24, 2013
INVENTOR(S)           : Carrel W. Ewing et al.

It is certified that error appears in the above-identified patent and that said Letters Patent is hereby corrected as shown below:

On the title page, in item (56), in column 2, under "Other Publications", line 6, delete "Initial" and insert -- Answer, --, therefor.

On title page 2, in item (56), in column 2, under "Other Publications", line 7, delete "Struxure" and insert -- Structure --, therefor.

On title page 2, in item (56), in column 2, under "Other Publications", line 9, delete "Struxure" and insert -- Structure --, therefor.

On title page 2, in item (56), in column 2, under "Other Publications", line 11, delete "PowerStruXure" and insert -- Power Structure --, therefor.

On title page 2, in item (56), in column 2, under "Other Publications", line 14, delete "PowerStruXure" and insert -- Power Structure --, therefor.

On title page 2, in item (56), in column 2, under "Other Publications", line 16, delete "Silcon" and insert -- Silicon --, therefor.

On title page 2, in item (56), in column 2, under "Other Publications", line 18, delete "Silcon" and insert -- Silicon --, therefor.

On title page 2, in item (56), in column 2, under "Other Publications", line 23, delete "StruXure" and insert -- Structure --, therefor.

In the Specification

In column 1, line 27, delete "current"" and insert -- current." --, therefor.

Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 8,541,906 B2

In column 2, line 46, delete "intput" and insert -- input --, therefor.

In column 2, line 52, delete "Installer" and insert -- installer --, therefor.

In column 3, line 2, delete "ease" and insert -- case --, therefor.